Figure 1:
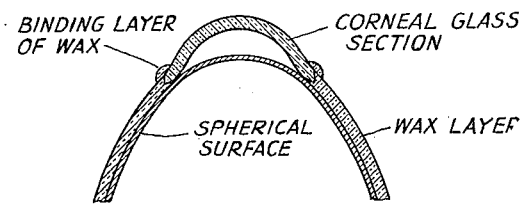

Nov. 7, 1939.   W. FEINBLOOM   2,178,873
METHOD OF AND MEANS FOR MAKING CONTACT LENSES
Original Filed June 26, 1936

INVENTOR
WILLIAM FEINBLOOM
BY Charles H. Brown
ATTORNEY

Patented Nov. 7, 1939

2,178,873

UNITED STATES PATENT OFFICE 2,178,873

METHOD OF AND MEANS FOR MAKING CONTACT LENSES

William Feinbloom, New York, N. Y.

Application June 26, 1936, Serial No. 87,577
Renewed December 3, 1937

13 Claims. (Cl. 88—54.5)

The present invention relates to methods of and apparatus for making contact lenses by taking a mold of the eye.

In my copending application Serial No. 72,970, filed April 6, 1936, there is disclosed a method of making a mold of the eye by pouring, at a certain temperature, a suitable plastic, such as a hydrocolloid composition known by the trade-name "Negocoll", or "Dentocoll", on the anesthetized eyeball and confining the pastic by means of a dam. A difficulty experienced in using this method has sometimes been caused by the creation of folds in the soft, thin tissue called the conjunctiva, which covers the eyeball. Another difficulty arises from the fact that many patients cannot keep their eyes sufficiently motionless during the setting period of the plastic to insure a perfect impression. Furthermore, there is at times a certain amount of pain and discomfort suffered by the patient because the lids cannot easily accommodate the dam which confines the plastic.

In brief, the present invention provides (a) an improved method of taking a mold of the eye, and (b) improved methods of manufacturing a contact lens to conform with the shape of the mold of the eye.

Among other things, the present invention overcomes the aforementioned difficulties and satisfies the following requirements in making a mold of the eye: (1) Permits the eye to move around freely during the time the impression of the eye is being taken; (2) enables the impression to be formed by the pressure of the lids without the use of any outside pressure which might compress the conjunctiva, or eyeball, in an irregular way; (3) allow the lids to close freely during the taking of the impression; and (4) is painless and non-irritating to the eye, thus preventing the vessels covering the globe from becoming unduly extended.

Moreover, the present invention provides simple and economical means for manufacturing a contact lens according to the mold taken of the eye, and also provides novel methods of correcting or perfecting a finished contact lens which is not absolutely accurate in every respect, that is, one which may fit the eye too tightly or too loosely, or whose corneal section may be too near or too far from the cornea of the eye.

In making the finished contact lens of the invention, it is proposed to employ for the scleral rim or sclerotic portion of the lens a synthetic resin, such as Bakelite or a Bakelite composition of a type somewhat similar to that known to the dental trade by the name "Luxene". The resin may either be transparent or opaque, and if the latter, may be dyed to give the appearance of the white of the eye.

Another advantage of the present invention is that the entire area of the scleral rim of the finished contact lens is made to rest on the sclerotic or white part of the eye, and not only a small part of the rim as is characteristic of contact lenses made by other methods.

Figure 2:
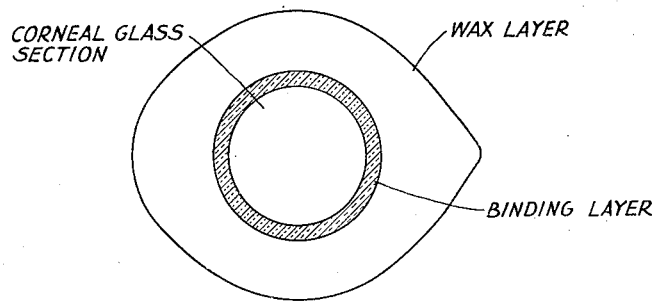
Figure 3:
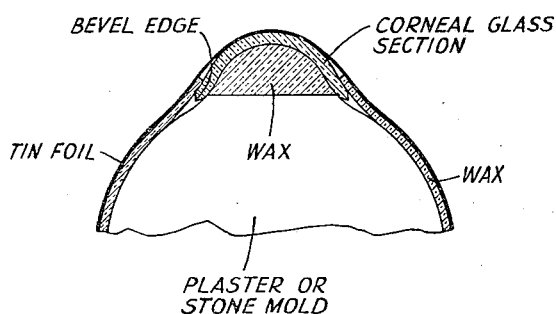
Figure 4:
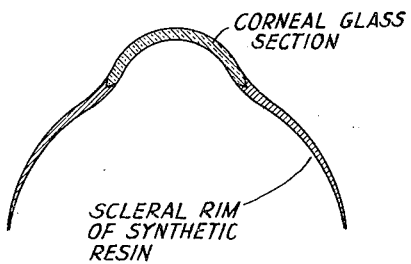

The invention is further explained in the following detailed description which is accompanied by a drawing, wherein:

Figs. 1, 2 and 3 illustrate various stages in the process of making a contact lens, and Fig. 4 illustrates a finished contact lens in accordance with the invention.

The manner in which the mold of the eye is taken, and the different ways in which the contact lens may be manufactured in accordance with the invention, will now be described.

*Method of taking mold of eye*

A thin layer of non-irritating wax which will soften at a temperature not sufficiently high to injure the eye and of a thickness of about .014" is placed on any suitable, smooth, spherical surface having the general shape of the eye, and the wax shaped so that no wrinkles appear. This surface may, for example, be a glass, metal, or plaster mold of a finished contact lens, or even another contact lens. Then, in the center of the surface, at the position corresponding to the corneal portion of the eye, a small circle of wax, about 10 mm. in diameter, is removed. A small corneal glass lens is prepared, about 11 mm. in diameter, which is placed around this opening in the wax, and around the edge of the lens, which is now lying on the layer of wax, a small quantity of heated wax is allowed to flow over the corneal lens in order to bind same to the wax layer. The surface of the corneal lens is then cleaned with chloroform to remove any surplus wax that may have flowed over it, and a suction nipple then applied to the lens itself in order to provide the means for holding this wax impression material while inserting and removing it from the eye, in the manner and for the reasons to be described later. Fig. 1 shows a cross-sectional view of the wax layer and glass corneal lens as it will appear at this stage of the process, before the application of the nipple.

A suitable contour is provided for the layer of wax shown in Fig. 1 by simply cutting it in the desired form. Thus, by shaping it with a pointed edge towards the outer canthus the manner in which the lens should be placed in the eye is readily determined. Fig. 2 is a plan view of the wax impression of Fig. 1 and illustrates how the wax layer is shaped to provide a pointed edge.

The mold of the eye is now ready to be taken. By means of the nipple, not shown, the entire impression material, consisting of the wax layer in the center of which is bound the glass corneal lens, is raised from the spherical molding surface and held by the nipple until placed in the eye.

The eye is first anaesthetized (as by cocaine), the wax impression material is filled with warm water, and then placed under the lids in contact with the sclera. The nipple is removed as soon as the wax impression material is in the eye. The lids are permitted to close and the eye is allowed to move about freely. The pressure of the lids, together with the temperature of the body, causes the wax to take the form of the globe. After two or three minutes, the eye is examined with a slit-lamp microscope. This permits a determination of the distance between the corneal glass lens and the cornea of the eye. A note is then made as to whether the finished lens must be placed closer to the cornea or further away. The corneal lens used for taking the impression has the same base curve as that of the finished contact lens, and in this manner, an accurate determination can be made of the distance which the lens should be from the cornea.

It is sometimes found, upon inspection, that the pressure of the lids is not sufficient to entirely mold the wax to the form of the globe. The wax may thereupon be softened by means of warm compresses placed against the wax, or by irrigating the eye with warm water, or finally, by means of an external heat source, such as a heating lamp.

When the wax is properly adapted to the eyeball, and no external force is used, it is then ready for chilling. The eye is irrigated with ice water, which causes the wax to chill and harden. The nipple is again attached to the glass portion of the impression material, and the entire impression is removed from the eye, care being taken that the lids are sufficiently separated to guard against distortion of the wax during removal.

If, as sometimes happens, the suction that keeps the wax in the eye is considerable, and it is desired to break this up before attempting to take the impression out of the eye, it may be done in one of a number of ways. First, by means of a suitable small hook, it is possible to raise one small part of the wax material away from the eye, which allows air to enter under the material and the water to run out. This will effectively break up the suction. Or, a small straw or glass capillary tube may be inserted beneath the edge of the wax and air blown under the wax. This, too, will cause the impression material to separate from the eye.

As soon as the wax is removed from the eye, it is placed in ice water and, as soon as possible thereafter, a cast formed therefrom with either plaster or dental stone.

This cast, which we will now call the mold, represents an exact replica of the eyeball, except that the conjunctiva, which ordinarily covers the eyeball loosely, has here been compressed to some extent over the entire eyeball.

It is this compression of the conjunctiva that requires a certain tolerance between the mold taken from the eye in this fashion, and the inner surface of the finished contact lens. The tolerance required varies somewhat from patient to patient, depending essentially on the pressure of their own lids, as well as the amount of heat used, the thickness of the wax used, and the amount of suction generated during the process of taking the impression.

This tolerance will vary usually from between .006″ to .015″. As will be explained later, it sometimes happens that it is necessary to allow different tolerances for different parts of the eye, and this can be done after the contact lens is finished.

*A method of making contact lens from mold of eye*

One method of making the contact lens from a mold obtained in the fashion hereinabove described is as follows:

*Step 1.*—The proper optical corneal lens section should be selected, which is determined by the patient's degree of hyperopia or myopia, or the condition of the cornea. This, for example, might be corneal irregularities, kerataconus or irregular astigmatism. The diameter of this corneal lens section should be approximately 13 mm. The edge of the lens should be beveled in a suitable fashion so as to have the resin material, to be applied later in the process to form the scleral rim or sclerotic portion of the finished contact lens, properly bind the lens. This resin material will form the sclerotic portion of the finished contact lens. This corneal lens should have its bevel polished so that no dividing line will be visible between the glass and the transparent resin.

*Step 2.*—The corneal section of the plaster mold should now be cut off.

*Step 3.*—The inner surface of the corneal lens should be filled with wax and the lens attached to the mold. Effectively, what we have done is to replace the plaster corneal part of the mold with wax, the purpose of which is to preclude the possibility of breaking the lens during the rest of the process, when the mold is under pressure.

*Step 4.*—The mold, with the corneal lens attached, should now be dipped in molten wax, so that the entire mold, including the lens, is covered with wax. This dipping process should be repeated until the thickness of the wax upon the mold is somewhat greater than the desired finished thickness of the contact lens, for example, 1 mm.

*Step 5.*—The wax should now be trimmed to fit the contour of the edge of the mold, and the wax around the glass corneal section further trimmed so as to leave about 1 mm. of wax on the glass where it rests on the mold.

*Step 6.*—This wax-covered mold should now be tinfoiled and the finished tinfoiled mold placed into the lower or male half of a flask. Any suitable thickness of tinfoil may be used although a thickness of .003″ has been found to be very satisfactory. Fig. 3 illustrates the appearance of the tinfoiled mold at this stage of the process.

*Step 7.*—Plaster is now poured into the upper half of the flask so as to form a female of the previously tinfoiled mold.

*Step 8.*—The two halves of the flask are now placed together and the flask boiled in water for about ten minutes to allow all the wax to melt and flow loose to the bottom of the flask. The two halves of the flask are then separated, and, it will be found that the tinfoil will have adhered to the upper or female half of the flask.

*Step 9.*—The corneal glass lens, which will now be loose, should be cleaned in chloroform, and the convex surface thereof cemented, as with Bakelite, in the proper position to the tinfoil in the lower section of the upper or female half of the mold contained in the upper half of the flask.

Step 10.—The positive half of the mold (the original mold), including the cut-off corneal part, should now be tinfoiled and the thickness of this tinfoil will determine to what extent the finished inner surface of the contact lens will vary in curvature from that of the mold, at each point. The usual difference in this curvature acquired is between .006″ and .015″. The method of determining just what thickness to allow depends on how tight or loose the impression material fitted the eye when originally taken. The allowance is easily determined by experience. If an error is made in the tolerance, this can later be corrected without the necessity of remaking the lens. This process will be explained subsequently.

Let us assume that we tinfoiled the male mold with .009″ thickness of tinfoil.

Step 11.—Both halves of the flask are heated in order that the "Luxene" resin, which will be applied later to form the scleral rim of the finished contact lens, may readily soften.

Step 12.—The "Luxene" or other suitable synthetic resin to form the rim should now be ground up and properly placed in the female half of the flask, which now holds the corneal glass lens, and the flask covered and placed in the vulcanizer.

Step 13.—The flask and contents should be vulcanized at a temperature of about 266° F. for a period of thirty minutes. The temperature and time for vulcanization may be varied, depending on how transparent and hard it is desired that the scleral rim material should be. It should be understood that the vulcanizing process is only one way of producing the desired hardness and transparency since a baking process would be equally suitable.

Step 14.—At the end of the vulcanizing period, the flask should be cooled and the contents afterwards removed. We now have a finished contact lens, consisting of a central corneal glass portion and a scleral rim of transparent "Luxene". The edges of the contact lens may now be trimmed and the desired thickness of the lens obtained by simply grinding with sandpaper. The lens should now be polished by pumice and a buff wheel, and in finished form will be as shown in Fig. 4.

*Methods of making changes in the contact lens after it is finished*

Let us assume, as often happens, that the tolerance allowed during the process of making the finished contact lens was not absolutely accurate. That is to say, instead of the .009″ tolerance, .015″ should, for example, have been allowed. Once the lens is finished, one may determine whether it fits the eye too tightly or too loosely, merely by inspecting the lens when placed in the eye.

With the foregoing assumption, it is desired, then, to further change the curvature at each point of the mold by an additional .006″ in radius. What we mean by this is that we now desire a shell which is concentric to that of the original mold, but that the radius of every point of this concentric shell shall be greater than the radius of the mold by .015″. To obtain this change, we may proceed as follows:

First: Cast a plaster or stone mold of the inner surface of the contact lens. Second: Tinfoil this mold with .006″ thickness of tinfoil. Cut off the tinfoil that corresponds to the glass portion of the contact lens. Third: Heat the tinfoil covered plaster mold on an electric or gas stove to about 300° F. Then remove the tinfoil covered mold from the stove. Fourth: Place the contact lens on the hot tinfoil mold and cover with a wet chamois cloth. Then press down with the fingers all around the "Luxene" scleral rim of the contact lens. The "Luxene" rim, it will be found, will readily conform to the new curvature of the mold. Fifth: Keep in this position for about one minute and then plunge into cold water, submerging the mold and lens until it is cool. The lens will now have the desired finished curvature of .015″ difference from the original mold, i. e., .009″ which was allowed during the making of the lens, and an additional .006″ as a correcting factor.

Suppose, on the other hand, it is desired to decrease the tolerance previously allowed during the making of the lens, for example, from .009″ down to .006″. The procedure would then be to tinfoil the inner surface of the finished lens with tinfoil of .003″ thickness, except for the corneal part. Then cast a mold of the inner surface of the lens in plaster. Now remove the tinfoil and heat the mold and proceed as outlined before. Press the lens onto the heated mold and submerge in cold water. The lens will now have a form concentric with the original plaster mold, but its tolerance will have been reduced .003″, and so will have a remaining total of .006″.

Let us suppose that the finished lens has a correct tolerance, but it is found to be too close to the eye; i. e., the inner surface of the corneal lens touches the cornea of the eye, and it is desired to move the corneal lens of the finished contact lens further away from the cornea of the eye, for a distance of, let us say, ½ mm. We may then proceed as follows: (*a*) Take a plaster mold of the inner surface of the finished lens. (*b*) Place a layer of wax of ½ mm. thickness over the corneal part of the plaster mold. Then press the finished contact lens down on this wax so that the wax has the same form as the inner curve of the finished glass portion of the contact lens. We should then remove the contact lens, leaving the wax on the plaster mold. (*c*) Cast a new negative of this mold with the wax in place. From this negative, which is also made in plaster, cast a new positive plaster mold. We now have a new positive plaster mold which has the same curvature, of both the corneal section and the scleral section, as the old one, except that the corneal section is raised ½ mm. further away from the sclera. (*d*) We should now proceed as outlined above, to heat the mold and press the lens onto this mold. The finished pressed lens will then have the same curvature as before, but its corneal section will have moved farther away by ½ mm.

Similarly, if it is desired to move the lens closer to the eye by ½ mm., the procedure is as follows: (*a*) insert a layer of wax or tinfoil of ½ mm. thickness inside the finished contact lens, covering only the corneal section. (*b*) Take a plaster mold of the inner curve of the lens with the wax or tinfoil in place, and after the plaster has set remove and discard the wax or tinfoil. (*c*) Heat this plaster mold and press the lens over it. Then plunge into cold water until cool. The finished lens will have the desired curvature and the corneal section will be ½ mm. closer to the cornea of the eye. This procedure may change the width of the scleral rim, but this may be cut down to the previous size by a process similar to that used when originally finishing the lens.

It sometimes happens that the original impression of the eye may not have been perfect, or that some change occurs during the handling of the wax impression. This will cause some error in the first mold taken from the original wax impression. In that case, it becomes necessary to make some correction in the finished lens. For example, it sometimes happens that the lens fits perfectly, and that suitable tolerance has been allowed at all except one small area at the edge of the lens. Perhaps the lower edge may be slightly too loose. The result is that the patient's lower lid will catch on the edge of the contact lens when the patient looks down. To correct this it is necessary to press the lower edge of the lens closer to the eye by an amount of either from .001" to possibly .003". This can readily be done in the following way: (a) Tinfoil the inner surface of the finished lens with the thickness of tinfoil desired; thus, either .001", .002", or .003" thickness. (b) Cut away the tinfoil from all except the lower portion of the lens. (c) Cast a plaster mold of the inner surface of the finished lens, which is partially tinfoiled. Remove the tinfoil and heat the plaster mold. (d) Press the lens into place, and plunge into cold water. The finished lens will now have the same tolerance as before, except in the lower portion, where it will fit closer by the degree of tinfoil thickness used. This method may, in general, be used to re-adapt the finished lens and allow for any corrections that have to be made.

*The preferred method of manufacturing a contact lens*

Although there has been described above one particular method of making a contact lens from the mold of the eye, the following is a preferred method of manufacture, which possesses the added advantages of simplicity and greater economy. It is now proposed, according to the invention, to make contact lenses of three or more standard sizes. These standard sizes could then readily be adapted, by the method described above, to fit any mold taken from the eye.

The method of manufacture would be as follows:

A trial lens with a fixed corneal radius of 8½ mm. would be supplied to the doctor. The outer curve of the corneal glass section would be such as to render it plano; i. e., it would have no refracting power.

The doctor would fit this trial contact lens, which would have a standard scleral radius of 12 mm., into the patient's eye. He would then examine the patient, as is customary, to determine how hyperopic or myopic the patient is with the contact lens in place. Suppose the examination discloses that the patient is myopic 5 diopters. The doctor will then take a mold of the patient's eye in the manner hereinabove described. He now orders from the manufacturer a standard contact lens with an 8½ mm. inner radius, and a refracting power of 5 diopters. (The actual refracting power would have to be slightly different from 5 diopters, due to the fact that the contact lens is very much closer to the eye than the spectacle lens with which the doctor made the examination.)

The manufacturer would have a stock of finished lenses, all made from standard molds of 12, 12½ or 13 mm. sclera radius. Upon order, he would send the doctor one of these standard finished contact lenses with the proper corneal lens section.

The doctor could thereupon press this standard lens over the mold that he has taken of his patient's eye, in the manner hereinbefore described, so as to conform the shape of the standard lens to the mold of the patient's eye. Thus the doctor can do away with the necessity of himself going through the manufacturing process of making a lens. This method will cut down both the time of manufacture, as well as the expense.

When the doctor tries the standard test lens of 12 mm. scleral radius, he can, by simple inspection, quickly decide whether it would be best to mold his lens from a standard 12, 12½ or 13 mm. "blank". The "blank" represents the standard forms of contact lenses supplied by the manufacturer.

It should be distinctly understood that the foregoing methods have been disclosed as illustrations and not as limitations of the invention, since various changes may be made by one skilled in the art without departing from the spirit and scope of the appended claims.

What is claimed is:

1. The method of taking a mold of the eye which comprises producing from a thin layer of plastic impression material a form of substantially hemispherical shape to conform very generally to the shape of the eye, removing from the center of said form a small circle of plastic material and replacing same with a hard surface to provide means for holding said impression material while inserting and removing it from the eye, attaching said hard surface to said impression material, applying a suction nipple to the outer surface of said hard surface to raise said plastic and for inserting same in the anesthetized eye, causing the plastic to assume the shape of the globe of the eye, subsequently chilling the plastic in the eye to cause same to harden, removing said hardened plastic without distorting its shape, and casting a mold from the hardened plastic.

2. The method defined in claim 1, including employing a smooth, hard, substantially spherical surface for producing the form of said plastic, removing from the center of said form a circle of material of about 10 mm. and replacing same with a corneal glass lens slightly larger than 10 mm. in diameter, and attaching said lens to said plastic at the edges of said lens by means of heated wax.

3. The method of manufacturing a contact lens which comprises casting a mold in accordance with the shape of an individual eye, heating the mold to a suitable temperature, applying over the heated mold a contact lens having a scleral rim of moldable material but whose corneal section provides a desired refractive correction, applying pressure to said contact lens for a suitable interval to cause said scleral rim to conform to the shape of said mold, and cooling said contact lens.

4. The method of manufacturing a contact lens which comprises casting a mold of an individual eye from stone or plastic, heating the mold to a temperature about 300° F., placing over said hot mold a contact lens having a corneal section of desired refractive correction and a scleral rim of moldable material having a suitable sclera radius, applying pressure to said contact lens for a suitable interval to cause said scleral rim to conform to the shape of said mold, and quickly cooling said mold and contact lens.

5. The method defined in claim 3, characterized in this that said scleral rim is made of a synthetic resin, and said contact lens is cooled by plunging both said mold and lens in cold water.

6. The method of correcting a finished contact lens having a scleral rim portion thereof which fits the eye too loosely, which comprises applying tinfoil to said portion at the inner surface thereof of a thickness equal to the amount of imperfection of said portion, casting a mold of the inner surface of said lens including said tinfoiled portion, removing said tinfoil, heating said mold to a suitable temperature, applying said lens with pressure to said heated mold for a suitable interval to cause the imperfect portion of said lens to conform to the shape of said mold, and then quickly cooling said lens.

7. The method of correcting a finished contact lens having a scleral rim portion which fits the eye too tightly, which comprises obtaining a mold of the inner surface of said lens; applying tinfoil to said mold to the part corresponding to that portion of the scleral rim portion of the lens which fits too tightly, and of a thickness which will give the desired correction; heating the tinfoil covered mold to a suitable temperature; placing the contact lens on the heated tinfoil covered mold; applying pressure to the lens for a suitable interval to cause the imperfectly fitting scleral portion of the lens to conform to the shape of the corresponding tinfoil covered part of the mold; and quickly cooling said contact lens.

8. The method of correcting a finished contact lens whose corneal portion is too close to the eye, which comprises casting a mold of the inner surface of the contact lens, applying a layer of wax of a thickness equal to the amount the corneal portion is too close to the eye over the corneal part of the mold, pressing the finished contact lens down on the mold so that the wax has the same form as the inner curve of the corneal portion of the contact lens, and subsequently removing the contact lens, thus leaving the wax on the mold, casting a negative of the mold with the wax in place, casting a positive mold from the negative obtained in the immediately preceding step, heating the last positive mold to a suitable temperature, placing the contact lens on the heated mold, applying pressure to the lens for a suitable interval to cause same to conform to the shape of the mold, and quickly cooling said lens.

9. The method of correcting a finished contact lens whose corneal portion is too far from the eye which comprises inserting a layer of wax inside the lens to cover the corneal portion, of a thickness equal to the distance said portion is too far from the eye, casting a mold of the contact lens with the wax in place, heating the mold to a suitable temperature, placing the contact lens over the heated mold, applying pressure to the lens for a suitable interval to cause same to conform to the shape of the mold, and quickly cooling the lens.

10. The method of manufacturing a contact lens which includes casting a mold in accordance with the shape of the eye, cutting off the corneal portion of the mold, selecting the proper optical corneal lens section for the finished contact lens and beveling the edge of same, filling the corneal lens with wax and attaching same to the mold to replace the cut-off portion, dipping the mold and corneal lens in heated wax to cover same to a suitable depth, applying a layer of tinfoil to the wax covered mold and lens, placing said tinfoil covered mold in the lower half of a flask whose other half is filled with plaster or stone, joining the two halves of the flask together and heating the flask in boiling water to cause the wax to melt and flow loose, separating the two halves of the flask and cementing the convex surface of the now loose corneal lens in proper position to the upper half of the flask, applying tinfoil of a suitable thickness to said mold located in the lower half of said flask, applying a ground-up synthetic resin to the upper half of the flask holding said corneal lens, joining the two halves of the flask and vulcanizing or baking the contents at a suitable temperature for a suitable period, and cooling the flask and removing the finished contact lens.

11. The method of manufacturing a contact lens which comprises inserting on the globe of eye a thin layer of a suitable non-irritating plastic of generally hemispherical form which will soften at a temperature not sufficiently high to injure the eye, allowing the plastic to remain on the globe of the eye for a time sufficient to enable the plastic to assume the shape of the globe, chilling the plastic in situs, then removing said plastic without distorting its shape, casting a mold therefrom, heating the mold to a suitable temperature, applying over the heated mold a contact lens having a scleral rim of moldable material but whose corneal section provides a desired refractive correction, applying pressure to said contact lens for a suitable interval to cause said scleral rim to conform to the shape of said mold, and cooling said contact lens.

12. The method of manufacturing a contact lens which includes casting a mold in accordance with the shape of the eye, cutting off the corneal portion of the mold, selecting the proper optical corneal lens section for the finished contact lens and beveling the edge of same, filling the corneal lens with wax and attaching same to the mold to replace the cut-off portion, dipping the mold and corneal lens in heated wax to cover same to a suitable depth, applying a layer of tinfoil to the wax covered mold and lens, placing said tinfoil covered mold in the lower half of a flask whose other half is filled with plaster or stone, joining the two halves of the flask together and heating the flask to cause the wax to melt and flow loose, separating the two halves of the flask and cementing the convex surface of the now loose corneal lens in proper position to the upper half of the flask, applying tinfoil of a suitable thickness to said mold located in the lower half of said flask, applying a ground-up synthetic resin to the upper half of the flask holding said corneal lens, joining the two halves of the flask and vulcanizing or baking the contents at a suitable temperature for a suitable period, and cooling the flask and removing the finished contact lens.

13. The method of manufacturing a contact lens which comprises producing from a thin layer of non-irritating plastic impression material a form of substantially hemispherical shape to conform very generally to the shape of the eye, said material having a softening point substantially not greater than body temperature, removing from the center of said form a small circle of plastic material and replacing same with a glass corneal section to provide, interalia, means for holding said impression material while inserting and removing it from the eye, attaching said glass section to said impression material, applying a suction nipple to the outer surface of said glass to raise said plastic and for inserting same in the anesthetized eye, causing the plastic to assume the shape of the globe, determining the proper distance between the glass corneal section and the cornea of the eye while said impression material is in the eye, chilling the impression material in situ, removing the chilled material, casting a mold therefrom, and obtaining from said mold a contact lens whose glass corneal section is removed from the eye by the distance determined during the process of making said mold.

WILLIAM FEINBLOOM.